United States Patent [19]

Chang et al.

[11] Patent Number: 5,219,930
[45] Date of Patent: Jun. 15, 1993

[54] PROCESS FOR CONVERTING VINYL ALCOHOL POLYMERS TO POLY(KETO-ESTERS) THEREFROM

[75] Inventors: Biau-Hung Chang, West Chester; Jack Kwiatek; Thomas S. Brima, both of Cincinnati, all of Ohio

[73] Assignee: Quantum Chemical Corporation, New York, N.Y.

[21] Appl. No.: 6,568

[22] Filed: Jan. 21, 1993

Related U.S. Application Data

[63] Continuation of Ser. No. 586,346, Sep. 21, 1990, abandoned.

[51] Int. Cl.$^5$ ............................................. C08C 19/04
[52] U.S. Cl. ..................................... 525/61; 525/387
[58] Field of Search ................................. 525/61, 387

[56] References Cited

U.S. PATENT DOCUMENTS

| | | | |
|---|---|---|---|
| 2,557,256 | 6/1951 | Brubaker et al. | 525/61 |
| 2,983,759 | 5/1961 | Matsumoto et al. | 525/61 X |
| 3,052,662 | 9/1952 | Shiraishi et al. | 525/61 |
| 3,053,605 | 9/1962 | Tanabe et al. | 525/61 X |
| 3,095,257 | 6/1963 | Tanabe et al. | 525/61 X |
| 3,859,269 | 1/1975 | Maurer | 525/61 |
| 3,976,621 | 6/1975 | Palladino et al. | 526/9 |
| 4,154,912 | 5/1979 | Philipp et al. | 525/61 X |
| 4,249,000 | 2/1981 | Batzer et al. | 525/61 X |
| 4,304,882 | 12/1981 | D'Angelo et al. | 525/61 X |
| 4,456,731 | 6/1984 | Caporossi et al. | 525/61 |
| 4,929,711 | 5/1990 | Chang et al. | 528/220 |
| 4,957,997 | 9/1990 | Chang et al. | 528/220 |
| 5,064,932 | 11/1991 | Chang et al. | 528/220 |

FOREIGN PATENT DOCUMENTS

1066730 12/1965 United Kingdom .

OTHER PUBLICATIONS

Abstract of 0261792; Jena, Republic of Dutch: Nov. 9, 1988.
Abstract of 0257014; Rezvika, USSR; Apr. 7, 1970.
Abstract of 1694831; Rhone-Poulence, Germany; May 24, 1973.
Abstract of 0028507; Ohgaki, Japan; Sep. 17, 1970.
*Enzyclopedia of Polymer Science and Technology*, vol. 14 (1971) pp. 169–174.
March, J.: *Advanced Organic Chemistry*, 3rd Edition, pp. 1057–1060.

*Primary Examiner*—Joseph L. Schofer
*Assistant Examiner*—J. M. Reddick
*Attorney, Agent, or Firm*—Kenneth D. Tremain; Gerald A. Baracka

[57] ABSTRACT

Processes for converting vinyl alcohol polymers to poly(keto-esters) and the novel products obtained therefrom are disclosed. The process involves reacting a vinyl alcohol polymer, such as PVA or EVOH, with an organic peroxyacid oxidizing agent in an inert liquid medium at a temperature from −20° C. to 150° C. to convert the secondary hydroxyl groups of the vinyl alcohol polymer to carbonyl and oxycarbonyl groups. In another aspect of the invention, the vinyl alcohol copolymer is first reacted with an oxidizing agent capable of converting the secondary hydroxyl groups to carbonyl but not to oxycarbonyl and then subsequently oxidized using a peroxyacid to form oxycarbonyl. The poly(keto-esters) comprised of carbonyl units, oxycarbonyl units, hydroxyl-containing units and units which are primarily hydrocarbons in nature are photodegradable and biodegradable.

20 Claims, No Drawings

PROCESS FOR CONVERTING VINYL ALCOHOL POLYMERS TO POLY(KETO-ESTERS) THEREFROM

CROSS REFERENCE TO RELATED APPLICATIONS

This is a continuation of application Ser. No. 07/586,346, filed Sep. 21, 1990, now abandoned.

BACKGROUND OF THE INVENTION

1. Field of the Invention

The present invention relates to a process for converting vinyl alcohol polymers. More particularly, the invention involves a process whereby the hydroxyl groups of vinyl alcohol polymers are oxidatively converted to carbonyl(keto) and oxycarbonyl(ester) moieties.

2. Background of the Invention

Vinyl alcohol polymers, including homopolymers and copolymers, are known. They are typically obtained by the partial or complete hydrolysis of a poly(-vinyl ester), most commonly poly(vinyl acetate) or a vinyl ester copolymer such as an ethylene-vinyl acetate copolymer. While numerous hydrolysis procedures can be used to obtain vinyl alcohol polymers, the most commonly used method employs a stoichiometric amount of base in water, e.g. aqueous NaOH. Ester interchange reactions which are carried out in the presence of an alcohol employing a catalytic amount of a base are also widely used to produce vinyl alcohol polymers. A variety of vinyl alcohol polymers including fully hydrolyzed products, typically having less than 1.5 mole percent residual acetate functionality, and partially hydrolyzed products, typically containing as much as 20 mole percent or more residual acetate groups, are commercially available.

The reactivity of the hydroxyl groups of vinyl alcohol polymers and their ability to undergo reactions typical of compounds containing secondary hydroxyl groups are well known and widely reported in the literature. For example, the hydroxyl group can be converted to borate, nitrate, phosphate and sulfate groups; they will react with carboxylic acids, carboxylic acid anhydrides and carboxylic acid chlorides, to form esters; they will react with alkylene oxides to form ethers; they will react with aldehydes to produce acetals; they will react with ketones to produce ketals, etc. For a discussion of these and other reactions of poly(vinyl alcohols) reference may be had to *Encyclopedia of Polymer Science and Technology*, Vol. 14, Interscience, a division of John Wiley & Sons, New York, 1971, pp. 169-174. In the same reference it is reported that poly(-vinyl alcohols) undergo crosslinking or degradation when subjected to oxidation by air (under alkaline conditions), t-butyl hypochlorite, uranyl acetate, and chromic acid. Hydrogen peroxide is reported to oxidatively degrade poly(vinyl alcohol) under acidic conditions.

British Patent Specification 1066730 discloses a process for oxidizing poly(vinyl alcohols) to produce polyenols of enhanced thermal stability consisting predominantly of recurring units of the structure

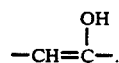
$$-CH=C-\overset{OH}{|}$$

The process entails oxidizing a poly(vinyl alcohol) in an aqueous alkaline medium using a mixture of cupric oxide or cupric hydroxide and a noble metal or noble metal oxide or hydroxide. While the reference does not mention the presence of keto groups in the polymer, the existence of such groups could reasonably be expected in view of the well recognized ability of enol groups to rearrange.

Polymeric hydroxy keto esters have been obtained by the process of U.S. Pat. No. 2,557,256. They are produced by reacting carbon monoxide, a polymerizable organic compound containing ethylenic unsaturation and an alcohol or an alkyl formate. These polymers have repeating keto units of the formula

$$-A-\overset{\overset{O}{\|}}{C}-$$

and repeating units of the formula

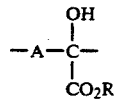
$$-A-\overset{OH}{\underset{CO_2R}{|}}-$$

combined, where A is the residue from the polymerizable organic compound ($C_2H_4$ in the case of ethylene) and R is the non-hydroxyl portion of the alcohol or alkyl group of the alkyl formate.

U.S. Pat. No. 3,976,621 discloses a process for rendering ethylene-vinyl alcohol copolymers photodegradable by reacting the copolymer with α-diazoacetophenone in the presence of an organic solvent and a catalyst consisting of a Lewis acid. The copolymers have α-ketoether groups pendant to the polymer chain.

U.S. Pat. No. 4,929,711 discloses a process for converting polyketones, such as are obtained by the polymerization of ethylene and carbon monoxide, to polyesters utilizing an organic peroxyacid oxidizing agent. A similar process for converting polyketones containing pendant functional groups to polyester is disclosed in U.S. Pat No. 4,957,997. U.S. Pat. No. 5,064,932 discloses poly(keto-esters). produced by the foregoing processes and comprised of carbonyl units, oxycarbonyl units and linking units derived from olefinic monomers.

It would be highly advantageous if a process were available whereby hydroxyl groups in vinyl alcohol polymers could be readily oxidized to carbonyl and oxycarbonyl groups. It would be even more advantageous if useful polymeric products were produced and if the oxidation did not substantially affect other functionality that might be present in the case of copolymers. It would be still more advantageous if the degree of oxidation could be controlled so that substantially all or only a portion of the hydroxyl functionality would be oxidized to carbonyl as well as oxycarbonyl moieties and if, as a result, the products were rendered both photodegradable and biodegradable. These and other advantages are realized by the process of the present invention and will be described in more detail to follow.

SUMMARY OF THE INVENTION

The present invention relates to an oxidative process for converting the hydroxyl functionality present in vinyl alcohol polymers to carbonyl and oxycarbonyl moieties, thereby rendering the resulting polymer photodegradable and biodegradable.

The process involves contacting a vinyl alcohol polymer containing from 0.01 to 50 mole percent hydroxyl (number of OH groups per total number of carbon atoms times 100) with an organic peroxyacid oxidizing agent having from 1 to 20 carbon atoms in an inert liquid medium at a temperature from $-20°$ C. to 150° C. The molar ratio of organic peroxyacid to hydroxyl group can range from 0.1:1 to 30:1 and the weight ratio of the inert liquid medium to vinyl alcohol polymer can range from 1:1 to 100:1. Substantially all or only a portion of the hydroxyl groups pendant to the polymer backbone can be converted to carbonyl and oxycarbonyl moieties. The vinyl alcohol polymers typically will have molecular weights greater than about 10,000 and may be either homopolymers or copolymers The process may be conducted as a single step or a two-step procedure wherein the vinyl alcohol is first reacted with an oxidizing agent capable of converting secondary hydroxyl groups to keto groups and then, in a subsequent operation, further oxidized using organic peroxyacids to the poly(keto-ester).

In a particularly useful embodiment of the invention, the vinyl alcohol polymer will have a molecular weight from about 10,000 to 1,000,000 and hydroxyl content from 0.5 to 20 mole percent. Organic peroxyacids which are especially useful oxidizing agents include chloro-, fluoro-, and carboxyl-substituted aromatic or aliphatic peroxyacids. These peroxyacids are particularly effective for the process when employed at molar ratios from 2:1 to 15:1 (peroxyacid:hydroxyl).

The process is highly useful for the conversion of ethylene-vinyl alcohol copolymers to the corresponding poly(keto-ester) products which exhibit a high degree of photodegradability and biodegradability. Poly(keto-esters) produced by the process of the invention are comprised of carbonyl units, oxycarbonyl units and hydroxyl-containing units of the formula

linked in a random fashion with units of the formula

where $R_1$ and $R_2$ are independently selected from the group consisting of hydrogen, alkyl, aryl or a functional group containing one or more oxygen, nitrogen, sulfur or halogen atoms. Molar ratios of hydroxyl to oxycarbonyl and carbonyl to oxycarbonyl can range from 0.01:1 to 100:1.

DETAILED DESCRIPTION OF THE INVENTION

The present invention broadly relates to a process for converting vinyl alcohol polymers to polymers having carbonyl and oxycarbonyl groups in the polymer chain. As employed herein the term vinyl alcohol polymers is used in its broadest sense to encompass any polymer having hydroxyl groups pendant to a hydrocarbon polymer backbone. In other words, the polymers will have units of the structure

distributed in the polymer backbone. Where, as is most typically the case, the vinyl alcohol polymer is obtained by the hydrolysis of a vinyl acetate polymer the recurring hydroxyl-containing units will correspond to the structure

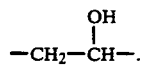

The hydroxyl units may be randomly or uniformly distributed throughout the polymer backbone with recurring units derived from other monomers.

All or a portion of the hydroxyl functionality of the vinyl alcohol polymer may be converted to carbonyl groups

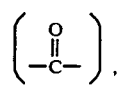

also referred to herein as ketone or keto groups, and oxycarbonyl groups

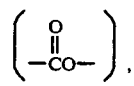

also referred to herein as ester groups. While not wishing to be bound by theory, it is believed that the hydroxyl group is first oxidized to the ketone and then, as the oxidation proceeds, to the ester. In fact, in one embodiment of this invention the vinyl alcohol polymer is converted to a polyketone and then, in a subsequent operation, converted further to poly(keto-ester).

Since the extent and type of reaction can vary, a wide variety of polymeric products can result. For the purpose of this invention these products are generically referred to as poly(keto-esters). This term, as employed herein, encompasses the numerous products which can result as the proportion of hydroxyl, carbonyl and oxycarbonyl groups is varied in the molecular species comprising the final product.

Considering a single hydroxyl on the polymer backbone, there are three possibilities—it can react or not react and, if it reacts, it may be oxidized to a carbonyl group or an oxycarbonyl group. The number of possible molecular configurations increases exponentially as the number of hydroxyl groups along the polymer chain which can enter into the reaction is increased. This number is even higher if one considers the possibility of head-to-head, head-to-tail, and tail-to-tail configurations and the numerous different arrangements which can result when two or more monomers are randomly polymerized. It will therefore be apparent to those skilled in the art, that it is not possible to provide a precise chemical formula encompassing all of the possible molecular species that can be formed.

Vinyl alcohol polymers utilized for the preparation of the poly(keto-esters) in the process of the invention are comprised of a hydrocarbon polymer chain backbone having a plurality of hydroxyl groups distributed there along. The polymer chain backbone is comprised substantially entirely of carbon atoms. Without regard to any other pendant functional groups, the hydroxyl groups may be either randomly or uniformly distributed along the polymer backbone.

Molecular weight (weight average) of the vinyl alcohol polymers can range from about 1,000 up to several million or more. It is possible to react extremely high molecular weight polymers (up to 5 million) in accordance with the present process to convert all or a portion of the hydroxyl moieties. More commonly, however, the vinyl alcohol polymer will have molecular weights greater than 10,000 and, more particularly, from about 10,000 up to about 1,000,000. The hydroxyl content, expressed in mole percent as previously defined, of the vinyl alcohol polymers will range from 0.01 up to about 50. Most usually the hydroxyl content will range from 0.5 mole percent u to about 20 mole percent.

The useful vinyl alcohol polymers can be obtained by any of the procedures known to the art. The method of preparation of the vinyl alcohol polymer plays no role in the process of the invention so long as the polymer is substantially free of impurities, such as catalyst residues or the like, which might interfere with the oxidation reaction. While the vinyl alcohol polymers are most commonly obtained by hydrolyzing the corresponding vinyl ester homopolymer or copolymer, they can also be obtained by other procedures.

When, as is generally the case, the vinyl alcohol polymers are obtained by hydrolyzing vinyl ester polymers the degree of hydrolysis can vary widely from as little as 1% up to essentially complete hydrolysis, i.e., greater than 99%. Numerous hydrolytic processes are known and are described in the art. For example, methods for varying the degree of hydrolysis by regulating the water content to obtain partially hydrolyzed polymers with predetermined vinyl alcohol contents are described in U.S. Pat. Nos. 2,386,347; 2,467,774; 3,344,129; 3,386,978 and 3,985,719. Partially hydrolyzed vinyl alcohol polymers, i.e. products having substantial residual vinyl acetate contents, find particular utility as adhesives and in applications involving crosslinking where control of the relative amounts of hydroxyl functionality is important. Since the vinyl alcohol polymers need not be fully hydrolyzed, it will be apparent to those skilled in the art that the resulting poly(keto-esters) produced by the process may also contain acetoxy or similar ester functionality in addition to hydroxyl, carbonyl and oxycarbonyl functionalities.

In an especially useful embodiment of this invention, poly(vinyl alcohol), abbreviated as PVA, obtained by the hydrolysis of poly(vinyl acetate) and ethylene-vinyl alcohol copolymers, abbreviated as EVOH, obtained by hydrolyzing ethylene-vinyl acetate copolymers are oxidized. PVA and EVOH products are commercially available in varying degrees of hydrolysis. In general, however, the degree of hydrolysis for the EVOH and PVA will not be less than 80% and, more usually, ranges from 85 to 99%.

Since vinyl esters, such as vinyl acetate, are known to copolymerize with many other monomers, numerous other vinyl alcohol copolymers corresponding thereto are available and can be advantageously used in the process of the invention provided any functional groups present therein are not oxidized or do not otherwise interfere with the reaction.

The physical characteristics of the resulting poly(keto-esters) are a function of the composition, molecular weight and molecular weight distribution of the vinyl alcohol polymer, the extent of conversion of hydroxyl groups and the ratio of carbonyl to oxycarbonyl groups formed. The latter two primarily depend on the reaction conditions and the amount of oxidizing agent used.

For the oxidation, the reaction is carried out in an inert liquid medium, that is, a material which is a liquid at the reaction temperature and which does not react with either the vinyl alcohol polymer or the poly(keto-ester) and which is not oxidized under the reaction conditions. Additionally, the liquid must be one which is capable of either dissolving or swelling the vinyl alcohol polymer. While the boiling point of the liquid medium is not critical, the boiling point should not be so high as to make removal of the solvent difficult. The reaction can be run at or below reflux temperature at atmospheric or elevated pressure.

Useful liquid mediums for the reaction include hydrocarbons, chlorinated hydrocarbons, nitrohydrocarbons, carboxylic acid esters and mixtures thereof. Hexane, heptane, octane, benzene, decalin, methylene chloride, chlorobenzene, dichlorobenzene, nitrobenzene and dimethylphthalate are illustrative of the compounds which can be used as the reaction medium for the process. Aliphatic ($C_{5-10}$) hydrocarbons, benzene, chlorinated aliphatic hydrocarbons, chlorobenzene and dichlorobenzene are particularly advantageous for the process. The weight ratio of the liquid medium to vinyl alcohol polymer can vary over broad limits but generally ranges from 1:1 to 100:1. More preferably, the weight ratio of liquid to vinyl alcohol polymer ranges from 5:1 up to about 50:1.

An oxidizing agent is necessary for the process and is dispersed or dissolved in the inert liquid medium and contacted with the vinyl alcohol polymer. The molar ratio of oxidizing agent to hydroxyl group ranges from about 0.1:1 to 0:1 and, more preferably, from 2:1 to 15:1. Organic peroxyacids are necessarily employed as the oxidizing agent in the present process to produce the poly(keto-esters).

Useful organic peroxyacids for the invention contain from 2 up to about 30 carbon atoms and correspond to the formula

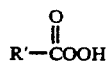

where R' is an aliphatic, cycloaliphatic or aromatic moiety which can be unsubstituted or substituted with one or more halo, nitro or carboxyl groups. When R' is aliphatic, i.e., an alkyl group, it will generally contain from 1 to 19 carbon atoms. When R' is cycloaliphatic, i.e., a cycloalkyl group, it will generally contain from 5 to 19 carbon atoms. When R, is aromatic, i.e. an aryl group, it will generally contain from 6 to 19 carbon atoms. As previously indicated, any of said alkyl, cycloalkyl or aryl groups can contain halo-, nitro- or carboxyl-substituents. Chloro and fluoro groups are particularly advantageous halo substituents. In a particularly useful embodiment, the organic peroxyacid oxidizing agent is a chloro-, fluoro- or carboxyl-substituted aromatic or aliphatic peroxyacid. Peroxybenzoic acid, m-chloroperoxybenzoic acid, peroxyacetic acid, trifluoroperoxyacetic acid, monoperoxyphthalic acid and monoperoxymaleic acid are representative of the oxidizing agents which can be used. m-Chloroperoxybenzoic acid and monoperoxymaleic acid have been found to be particularly advantageous. The peroxyacid can be used as such or formed in situ, e.g., by the reaction of maleic anhydride with hydrogen peroxide.

The oxidation can be conducted at temperatures from about −20° C. up to about 150° C.; however, it is generally considered most advantageous to carry out the reaction at a temperature from about 20° C. to 100° C. While reaction time will vary depending on reactants, the liquid medium, the reaction temperature, and the desired conversion, it can range from a few minutes up to 24 hours or more. Prolonged reaction times can result in undesirable amounts of degradation.

While the poly(keto-ester) products are conveniently obtained in a single operation following the above-described procedure, in another embodiment of the invention, a two-step procedure is employed. In the two-step operation the vinyl alcohol polymer is first reacted to convert a portion of the hydroxyl groups to keto functionality using oxidizing agents capable of converting secondary alcohols to carbonyl but not to oxycarbonyl. The resulting polyketone product is then oxidized in a subsequent operation utilizing an organic peroxyacid in accordance with the above-described process to convert all or a portion of the keto functionality produced by the first oxidative treatment to oxycarbonyl groups. This two-step approach may be advantageous with certain vinyl alcohol polymers to reduce polymer degradation, particularly when high hydroxyl conversions are desired.

The initial oxidation step to convert the vinyl alcohol polymer to a polyketone can utilize known oxidizing agents capable of converting secondary hydroxy groups to keto groups. Such oxidizing agents can include sodium hypochlorite, aluminum isopropoxide, chromic acid, permanganate and the like. For a general discussion of the oxidation of alcohols to ketones and the various oxidizing agents which can be used, reference may be had to pages 1057–1060 of the text *Advanced Organic Chemistry*, J. March, 3rd Ed., J. Wiley and Sons. The particular oxidation procedure employed for the first step in the process is not critical as long as it is applicable to polymer materials and does not unduly degrade the polymer.

A particularly effective first step oxidation procedure utilizes sodium hypochlorite as the oxidizing agent. In general the oxidation using sodium hypochlorite can be carried out in essentially the same manner as described for the organic peroxyacid oxidation. The vinyl alcohol polymer will be dissolved or dispersed in a suitable liquid medium of the type previously defined and the sodium hypochlorite, typically a 5 percent solution in water, added thereto. Known agents to control the pH of the mixture, such as sodium bicarbonate or the like, may also be added usually as aqueous solutions. The weight ratio of solvent to polymer can vary from 1:1 to 100: and, more preferably, from 5:1 to 50:1 while the molar ratio to sodium hypochlorite to hydroxyl functionality can range from 0.1:1 to 30:1 and, more preferably, 2:1 to 15:1. Oxidations using sodium hypochlorite are generally carried out at a temperature from 20° C. to 150° C. and, more preferably, from 40° C. to 100° C.

Since essentially none of the hydroxyl groups of the vinyl alcohol polymer are converted to oxycarbonyl using sodium hypochlorite, the resulting polyketone product is subjected to further oxidation using the organic peroxyacids. The polyketone formed in the first oxidation step may be isolated prior to proceeding with the second oxidation step but this is not necessary. The second oxidation step may be commenced by simply adding the organic peroxyacid directly to polymer dispersion obtained from the first step. If this is the case, it may be advantageous to adjust the pH of the mixture, remove some of the water and/or solvent, add a different solvent, or the like. The second step of the process to form oxycarbonyl can then be commenced in accordance with the usual procedure.

The second step oxidation will not necessarily be limited to oxidizing keto groups to ester groups. Residual hydroxyl functionality present in the polyketone may also be oxidized to carbonyl or oxycarbonyl groups.

Reaction conditions and time of reaction are selected based on the degree of conversion of hydroxyl and extent of oxidation, i.e., the ratio of carbonyl to oxycarbonyl functionality, desired. As previously pointed out, the process need not be conducted in such a way that all hydroxyl functionality is reacted or, for that matter, that all of the hydroxyl groups reacted are completely oxidized to ester groups. In some instances it is even advantageous for the poly(keto-esters), to contain some residual hydroxyl functionality.

The poly(keto-ester) products prepared in accordance with the invention, whether they contain primarily oxycarbonyl moieties or substantial amounts of both carbonyl and oxycarbonyl groups, are recovered utilizing conventional procedures known to the art. This is so without regard to whether residual hydroxyl functionality is present. Generally, the polymer solution or polymer dispersion is cooled to ambient conditions to precipitate the polymer which is then recovered by filtration. To facilitate this precipitation, precipitating diluents which are non-solvents for the polyester, i.e. do not dissolve or swell the polymer, can be added. Such precipitating diluents include but are not limited to methanol, ethanol, propanol, t-butanol, acetone and the like. Since excess oxidizing agent and by-products formed as a result of the reaction, e.g. carboxylic acids, may be precipitated with the polyester it may be advantageous to redissolve the polymer in a solvent, such as toluene or xylene, and re-precipitate by the addition of one or more of the aforementioned precipitating diluents The recovered polymer is then dried and, if desired, additives incorporated there in.

The poly(keto-esters) produced in accordance with the above-described procedures are comprised of carbonyl units, oxycarbonyl units, and hydroxy-containing units of the formula

linearly linked in a random manner with units of the formula

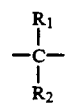

where $R_1$ and $R_2$ are independently selected from the group consisting of hydrogen, alkyl, aryl, or a functional group containing one or more oxygen, nitrogen, sulfur or halogen atoms. Where the poly(keto-ester) is obtained by oxidizing EVOH, the latter units are predominantly methylene units, i.e., $R_1$ and $R_2$ are both hydrogen.

A poly(keto-ester) obtained by incomplete oxidation of a partially hydrolyzed EVOH derived from EVA would be substantially comprised of the following recurring units:

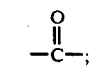

and

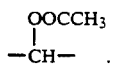

These units would be randomly distributed throughout the polymer backbone, the distribution being dependent on the structure of the starting EVOH copolymer and the extent of oxidation. Random distribution of these repeating units within the poly(keto-ester) is assured since the oxidation may proceed to either carbonyl or oxycarbonyl and, when only a portion of the hydroxyl groups are oxidized, the oxidation occurs in a more or less random fashion. Any comonomer(s) present will also influence distribution as will the extent of hydrolysis when the vinyl alcohol polymer is derived from a vinyl ester polymer.

Since some chain scission generally occurs as a result of the oxidation, the molecular weight of the poly(keto-ester) is typically lower than that of the starting vinyl alcohol polymer. In general, the poly(keto-esters) have molecular weights (weight average) greater than 1000. Usually the molecular weights will range from about 5,000 to about 1,000,000. Poly(keto-esters) with molecular weights from 10,000 up to 500,000 are most commonly produced. The molar ratio of hydroxyl to oxycarbonyl generally ranges from about 0.01:1 to 100:1 with the molar ratio of carbonyl to oxycarbonyl ranging from about 0.01:1 to 100:1. In an especially useful embodiment of the invention, the poly(keto-esters) will have hydroxyl to oxycarbonyl molar ratios from 1:1 to 60:1 and carbonyl to oxycarbonyl molar ratio from 0.1:1 to 20:1.

Whereas the substrate vinyl alcohol polymers are resistant to substantial degradation by photochemical or biological means, the introduction of carbonyl groups into the substrate polymer chain introduces photodegradability due to the absorption of radiation by the carbonyl chromophore *Comprehensive Polymer Science*, Vol 6, Pergamon Press, p. 530. The product is further rendered susceptible to degradation by the action of living organisms when substantial amounts of oxycarbonyl moieties are introduced. Thus the present process is capable of producing polymers which are both photodegradable and biodegradable. This is a particularly useful combination of properties. It is equally significant that the balance of photodegradability and biodegradability can be varied depending on the amount of hydroxyl functionality converted and the ratio of carbonyl to oxycarbonyl groups produced upon oxidation.

Degradable poly(keto-esters) obtained in accordance with the present process are highly useful as plastic materials and waxes. The present products are also useful as adhesives and coatings. In view of the concern about disposal of plastic waste, there is an increasing demand for environmentally degradable polymeric materials. The combination of photodegradability and biodegradability in polymeric materials is an extremely desirable characteristic. It is an added advantage that the poly(keto-esters) produced for the present process are intrinsically biodegradable, i.e., they do not require the addition of biodegradable additives such as starch.

The following examples illustrate the invention more fully; however, they are not intended as a limitation on the scope thereof. In the examples all parts, percentages and ratios are on a weight basis unless otherwise indicated.

EXAMPLE I

A poly(keto-ester) was prepared by oxidizing an EVOH copolymer. The EVOH (Mw 87,800; 1.3 mole percent OH per total number of carbon atoms) was obtained by the hydrolysis of an EVA copolymer having 9% vinyl acetate copolymerized. For the reaction, 20.0 grams EVOH was charged to the reactor containing 700 mls of heptane/dimethylphthalate solution (volume ratio 2.5:1). The weight ratio of the diluent to EVOH was 29:1. The temperature of the mixture was then raised to 90–100° C. and maintained to dissolve/swell the polymer and then lowered to 60° C. m-Chloroperoxybenzoic acid (49.5 grams) was charged in increments over a period of approximately 12 hours (molar ratio of oxidizing agent to hydroxyl Was 15 8 1) and the reaction mixture stirred for 37 hours at 60° C. The reaction mixture was then cooled to room temperature and the polymer was precipitated by the addition of an approximately equal volume of methanol. The poly(keto-ester) was recovered by filtration, dissolved in toluene and reprecipitated using methanol. After drying the polymer was analyzed by infrared and nuclear magnetic resonance (NMR) spectroscopy. The molecular weight of the poly(keto-ester) was 42,600 and, based on the NMR analysis, contained 0.9 mole percent hydroxyl groups (OH), 0.21 mole percent carbonyl groups (CO), and 0.21 mole percent oxycarbonyl groups (COO). Molar ratios of OH:COO and CO:COO were 4.3:1 and 1:1, respectively.

To demonstrate the ability of the poly(keto-ester) to form a hot melt bond and to resist increases in temperature, one square inch of the polymer was sandwiched between two 1"×4" pieces of Kraft paper and melt bonded under pressure. A shear force of 500 grams was then applied to the melt bonded specimen while the temperature was increased from 50° C. in 5° C. increments every 15 minutes until failure occurred. The specimen adhered with the poly(keto-ester) withstood delamination until the temperature reached 105° C. (average of 5 tests).

EXAMPLE II

To demonstrate the ability to vary the composition of the poly(keto-esters) the process of Example I was repeated except that the MCPBA:OH molar ratio was 14.1:1 and the reaction time was reduced to 13 hours. The resulting poly(keto-ester) had a molecular weight of 59,000 and molar ratios of OH:COO and CO:COO of 17:1 and 1:1, respectively.

EXAMPLE III

The general procedure of Example I was repeated except that the molar ratio of the MCPBA:OH was 4.2:1 and the ratio of the diluent to EVOH was 11:1. The diluent was comprised of heptane and dimethylphthalate at a volume ratio of 3.7:1. The oxidation was carried out at 80° C. for 45 hours and the resulting poly(keto-ester) had a molecular weight of 19,300. Molar ratios of OH:COO and CO:COO were 3.5:1 and 0.7:1, respectively.

EXAMPLE IV

Using a different EVOH copolymer, a series of reactions were carried out following the general procedure of Example I. The EVOH copolymer used for these experiments had a molecular weight of 47,600 and contained 2.8 mole percent hydroxyl functionality. The EVOH was obtained by hydrolyzing an EVA copolymer having a vinyl acetate content of 14%. Three oxidations, identified as IV(A), IV(B), and IV(C), were conducted under varying conditions. The oxidizing agent employed for all of the reactions was m-chloroperoxybenzoic acid and mixtures of heptane/-dimethylphthalate were used as the diluent. Details for each reaction and the resulting poly(keto-ester) obtained therefrom were as follows:

|  | IV(A) | IV(B) | IV(C) |
|---|---|---|---|
| MCPBA:OH | 6.7:1 | 7.5:1 | 3.4:1 |
| Heptane:DMP | 5:1 | 5:1 | 0.6:1 |
| Diluent:EVOH | 23:1 | 23:1 | 22:1 |
| Temperature (°C.) | 60 | 60 | 80 |
| Time (hrs) | 8 | 31 | 22 |
| Poly(keto-ester): | | | |
| $M_w$ | 31,100 | 22,600 | 11,800 |
| OH:COO | 22:1 | 4.8:1 | 9.5:1 |
| CO:COO | 1.3:1 | 0.1:1 | 2.5:1 |

To demonstrate the ability of the poly(keto-ester) products of this invention to be degraded by living organisms, IV(B) was tested following the procedure outlined in ASTM G-21-70, "Determining Resistance of Synthetic Polymer Materials to Fungi." As a control, the EVOH copolymer was also evaluated. For the test approximately 1 gram of polymer film coated on a fiberglass tape was placed on a mineral salts agar medium and sprayed with a combined suspension of spores of *Aspergillus niger, Penicillium funiculosum, Chaetomium globosum, Gliocladium virens* and *Aureobasidium pullulans*. After inoculation the samples were placed in an incubator maintained at 30±1° C. and relative humidity greater than 85%. After 60 days the samples were removed and the weight loss recorded. A four percent weight loss was observed for poly(keto-ester) IV(B) while the EVOH copolymer control produced a one percent weight gain.

EXAMPLE V

Two poly(keto-esters), identified as V(A) and V(B), were prepared in accordance with the previously described oxidation procedure. The EVOH copolymer used to prepare these poly(keto-esters) had a molecular weight of 45,300, contained 3.38 mole percent hydroxyl functionality, and was obtained by the hydrolysis of an EVA having a vinyl acetate content of 19%. MCPBA was used as the oxidizing agent and the reaction was carried out in heptane/dimethylphthalate diluent. The table which follows details the reaction conditions and characterizes the poly(keto-esters) products which were obtained:

|  | V(A) | V(B) |
|---|---|---|
| MCPBA:OH | 2.8:1 | 5.6:1 |
| Heptane:DMP | 1:1 | 2.8:1 |
| Diluent:EVOH | 22:1 | 28:1 |
| Temperature (°C.) | 80 | 60 |
| Time (hrs) | 22 | 60 |
| Poly(keto-ester): | | |
| $M_w$ | 11,900 | 18,500 |
| OH:COO | 7.5:1 | 7.5:1 |
| CO:COO | 1.4:1 | 1.4:1 |

Poly(keto-ester) V(A) was used to hot melt bond Kraft paper and evaluated in accordance with the procedure described in Example I. Shear adhesion failure occurred only after the temperature reached 112° C. Poly(keto-ester) V(B) was evaluated for degradability by living organisms in accordance with ASTM G-21-70. A 5% weight loss was observed after 60 days whereas less than 1% weight loss was obtained for the corresponding EVOH control.

EXAMPLE VI

To demonstrate the ability to prepare poly(ketoesters) using a two-step oxidation procedure the following experiment was conducted. Typically, EVOH copolymer (24.7 grams) was dissolved in a liter of heptane by heating at 90° C. The EVOH used was the same as employed in Example I. The temperature of the solution was then decreased to 70° C. and maintained with stirring. Aqueous sodium bicarbonate (6 grams in 125 mls $H_2O$) was then added with 0.8 gram tetrabutyl ammonium chloride as a phase transfer agent followed by the addition of aqueous sodium hypochlorite (60 mls of a 5% solution) over a period of 15–30 minutes and the mixture was stirred at 70° C. for 20 hours. At the end of the reaction period, the contents of the reactor were cooled and the polymer recovered in the conventional manner. Analysis of the polymer confirmed the presence of 0.63 mole percent carbonyl.

The above-prepared polymer (molecular weight 46,350) was dissolved in hot heptane (27.5 grams in 1000 mls) and the solution maintained at 70° C. A solution of 26 grams m-chloroperoxybenzoic acid in 200 mls methylene chloride was then added over a four-hour period. Methylene chloride which distilled from the mixture was collected in a trap. Additional m-chloroperoxybenzoic acid (40 grams dissolved in 400 mls methylene chloride) was added after 6 hours and again (25 grams in 250 mls methylene chloride) after 18 hours. After 32 hours total reaction time the mixture was cooled and the polymer recovered by precipitation with methanol. The resulting poly(keto-ester) had a molecular weight of 8,614 and contained 0.6 mole percent hydroxyl, 0.3 mole percent carbonyl and 1.2 mole percent oxycarbonyl.

We claim:

1. A process for converting vinyl alcohol polymer to poly(keto-esters) which comprises contacting a vinyl alcohol polymer of molecular weight greater than 1000 and containing from 0.01 to 50 mol percent hydroxyl functionality with a peroxyacid oxidizing agent having from 2 to 30 carbon atoms and selected from the group consisting of aliphatic, cycloaliphatic or aromatic peroxyacids and halo-, nitro- or carboxyl-substituted aliphatic, cycloaliphatic or aromatic peroxyacids in an inert liquid medium selected from the group consisting of hydrocarbons, chlorinated hydrocarbons, nitrohydrocarbons, carboxylic acid esters and mixtures thereof at a temperature from −20° C. to 150° C.; the molar ratio of peroxyacid oxidizing agent to hydroxyl ranging from 0.1:1 to 30:1 and the weight ratio of inert liquid medium to vinyl alcohol polymer ranging from 1:1 to 100:1.

2. The process of claim 1 wherein the vinyl alcohol polymer is obtained from the hydrolysis of a vinyl ester polymer.

3. The process of claim 2 wherein the vinyl alcohol polymer is poly(vinyl alcohol) or an ethylene-vinyl alcohol copolymer.

4. The process of claim 3 wherein the organic peroxyacid oxidizing agent corresponds to the formula

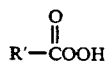

wherein R' is an alkyl group having from 1 to 19 carbon atoms; a cycloalkyl group having from 5 to 19 carbon atoms; an aryl group having from 6 to 19 carbon atoms; a halo-, nitro-, or carboxyl-substituted alkyl group having from 1 to 19 carbon atoms; a halo-, nitro- or carboxyl-substituted cycloalkyl group having from 5 to 19 carbon atoms; or a halo-, nitro-, or carboxyl-substituted aryl group having from 6 to 19 carbon atoms.

5. The process of claim 4 wherein the reaction is carried out at a temperature from 20° C. to 100° C. and the weight ratio of inert liquid medium to vinyl alcohol polymer is from 1 to 50:1.

6. The process of claim 5 wherein the organic peroxyacid oxidizing agent is m-chloroperoxybenzoic acid.

7. The process of claim 6 wherein the vinyl alcohol polymer is an ethylene-vinyl alcohol copolymer having a molecular weight from 10,000 to 1,000,000 and a hydroxyl content from 0.5 to 20 mole percent.

8. The process of claim 7 wherein the ethylene-vinyl alcohol copolymer is obtained by hydrolyzing an ethylene-vinyl acetate copolymer and the degree of hydrolysis is from 85 to 99 percent.

9. The process of claim 5 wherein the inert liquid medium is heptane.

10. The process of claim 5 wherein the inert liquid medium is a mixture of heptane and dimethylphthalate.

11. The process of claim 1 wherein, prior to contacting with the peroxyacid, the vinyl alcohol polymer is contacted with sodium hypochlorite in an inert liquid medium selected from the group consisting of hydrocarbons, chlorinated hydrocarbons, nitrohydrocarbons, carboxylic acid esters and mixtures thereof at a temperature from 20° C. to 150° C.; the molar ratio of sodium hydrochlorite to hydroxy functionality ranging from 0.1:1 to 30:1 and the weight ratio of inert liquid medium to vinyl alcohol polymer ranging from 1:1 to 100:1.

12. The process of claim 11 wherein the vinyl alcohol polymer is obtained from the hydrolysis of a vinyl ester polymer.

13. The process of claim 12 wherein the vinyl alcohol polymer is poly(vinyl alcohol) or an ethylene-vinyl alcohol copolymer.

14. The process of claim 13 wherein

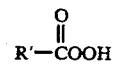

wherein R' is an alkyl group having from 1 to 19 carbon atoms; a cycloalkyl group having from 5 to 19 carbon atoms; an aryl group having from 6 to 19 carbon atoms; a halo-, nitro-, or carboxyl-substituted alkyl group having from 1 to 19 carbon atoms; a halo-, nitro- or carboxyl-substituted cycloalkyl group having from 5 to 19 carbon atoms; or a halo-, nitro-, or carboxyl-substituted aryl group having from 6 to 19 carbon atoms.

15. The process of claim 14 wherein the organic peroxyacid oxidizing agent is m-chloroperoxybenzoic acid.

16. The process of claim 15 wherein the vinyl alcohol polymer is an ethylene-vinyl alcohol copolymer having a molecular weight from 10,000 to 1,000,000 and a hydroxyl content from 0.5 to 20 mole percent.

17. The process of claim 16 wherein the ethylene-vinyl alcohol copolymer is obtained by hydrolyzing an ethylene-vinyl acetate copolymer and the degree of hydrolysis is from 85 to 99 percent.

18. The process of claim 14 wherein the reaction with sodium hypochlorite is carried out at 40° C. to 100° C., the reaction with the peroxyacid is carried out at 20° C. to 100° C. and the weight ratio of inert liquid medium to vinyl alcohol polymer is 5:1 to 50:1.

19. The process of claim 18 wherein the inert liquid medium is heptane.

20. The process of claim 18 wherein the inert liquid medium is a mixture of heptane and dimethylphthalate.

* * * * *

UNITED STATES PATENT AND TRADEMARK OFFICE
CERTIFICATE OF CORRECTION

PATENT NO. : 5,219,930

DATED : June 15, 1993

INVENTOR(S) : B.H. Change, J. Kwiatek and T.S. Birma

It is certified that error appears in the above-indentified patent and that said Letters Patent is hereby corrected as shown below:

Col. 13, line 36 (claim 5), --5:-- should be inserted before "1", first instance.

Col. 14, line 17 (claim 14), after "wherein" insert --the organic peroxyacid oxidizing agent corresponds to the formula--.

Signed and Sealed this

Twenty-second Day of February, 1994

Attest:

BRUCE LEHMAN

Attesting Officer     Commissioner of Patents and Trademarks